Aug. 12, 1924. 1,504,767
W. LA HODNY
MOUNTING FOR WINDSHIELD WINGS, ETC
Filed Aug. 9, 1922
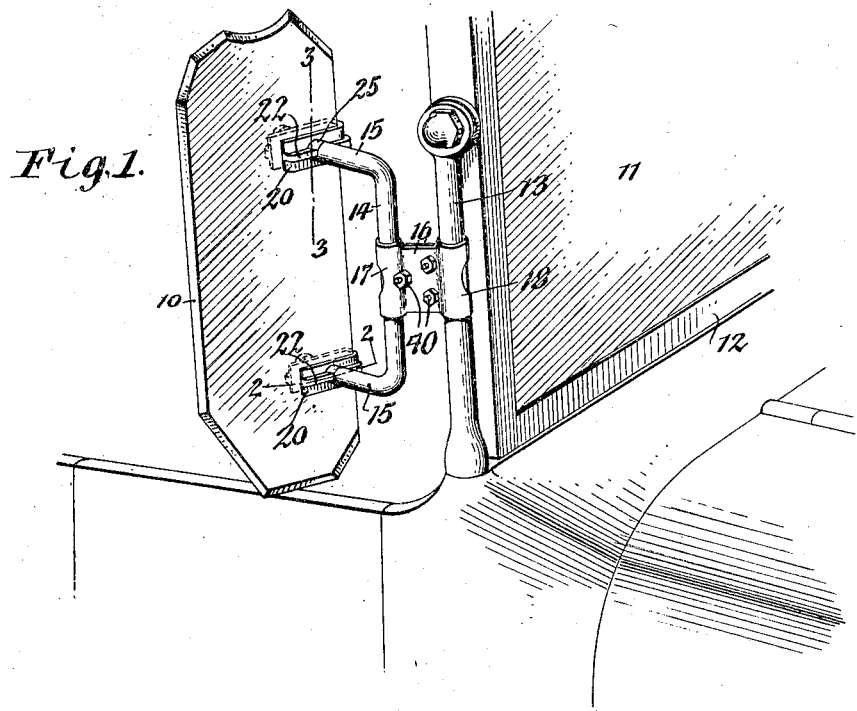
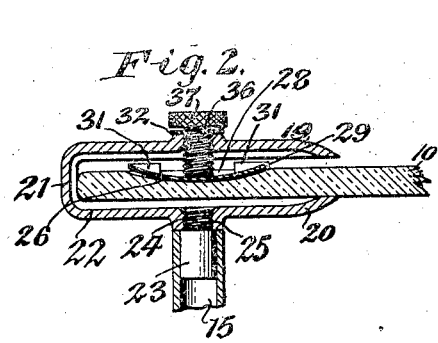
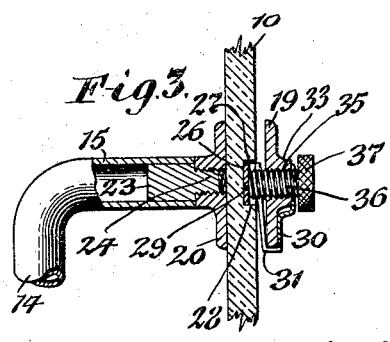
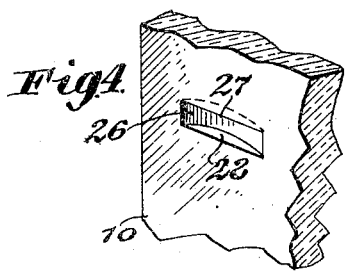
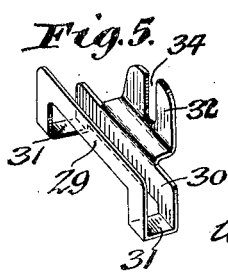
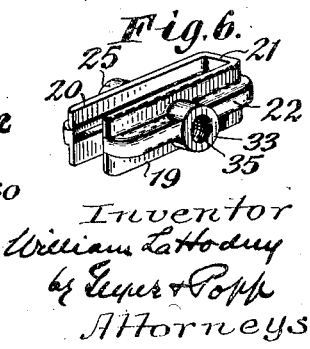

Patented Aug. 12, 1924.

1,504,767

UNITED STATES PATENT OFFICE.

WILLIAM LA HODNY, OF BUFFALO, NEW YORK.

MOUNTING FOR WINDSHIELD WINGS, ETC.

Application filed August 9, 1922. Serial No. 580,637.

*To all whom it may concern:*

Be it known that I, WILLIAM LA HODNY, a citizen of the United States, residing in Buffalo, in the county of Erie and State of New York, have invented new and useful Improvements in Mountings for Windshield Wings, Etc., of which the following is a specification.

This invention relates to a bracket which is more particularly designed for supporting wings upon a frame of an automobile wind shield, although the same may also be used on similar installations, if desired.

One of the objects of this invention is to provide a bracket for this purpose which will support such wings, and which are usually made of glass plates without perforating these glass plates and thus reduce the liability of fracturing or breaking such plates as has been commonly the case heretofore.

Another object of this invention is to provide a bracket of this character which will support the glass wind shield wing firmly and reliably without liability of the plate becoming loose on the bracket or slipping out of place.

This invention has the further object to provide a bracket for this purpose which is comparatively simple and inexpensive in construction and which permits of readily applying the wheel shield thereto, as well as removing the same therefrom in the event that replacement is necessary due to breakage.

In the accompanying drawings: Figure 1 is a perspective view showing my improvement embodied in a bracket for supporting a wind shield wing on the frame of an automobile wind shield. Figure 2 is a fragmentary horizontal section, on an enlarged scale, taken on line 2—2, Fig. 1. Figure 3 is a fragmentary vertical section, on an enlarged scale, taken on line 3—3, Fig. 1. Figure 4 is a fragmentary perspective view of the glass wind shield wing showing the notch therein for co-operation with the bracket while the same is mounted on the wind shield frame. Figure 5 is a perspective view of one of the clips forming part of the wind shield bracket. Figure 6 is a similar view of one of the supporting heads of the bracket embodying my invention.

Similar characters of reference refer to like parts throughout the several views.

Although this bracket may be adapted for supporting a wind shield wing on a wind shield frame of any suitable character, the construction shown in the drawings is designed to support a wind shield wing which has the form of a glass plate 10 and a wind shield 11 with which this wing is associated, is mounted on the frame 12 which is pivoted in each of its vertical edges on the upper end of the post or standard 13 which rises from the body of the automobile.

In its general organization my improved bracket comprises a yoke, the central part of which is mounted on the wind shield standard or post 13, two clamping heads arranged at opposite ends of the yoke and adapted to embrace the upper and lower parts of the wind shield wing along one of its vertical edges, and clamping and locking means which are mounted on the clamping heads and serve to hold the wind shield wing securely in place on these heads.

The yoke, in the preferred construction, is generally of U-shaped form and is preferably made of a hollow tube or rod which is bent so as to form an upright wrist 14 and horizontal arms 15, 15 extending laterally from the upper and lower ends of the wrist.

The central part of the wrist 14 is pivotally supported upon the central part of the post or standard 13 by means of two clamping plates 16, 16 which are provided at opposite corresponding ends with jaws 17, 18 and clamping bolts 40 which connect the central parts of the clamping head 16 and draw the jaws 17, 18 at opposite ends of these plates against opposite sides of the wrist 14 and the standard 13 so that these parts are frictionally connected and operate to hold the yoke against displacement under ordinary pressure, but will yield in order to permit this yoke and the plates 16 to be shifted horizontally for the purpose of adjusting the wind shield wing 10 into different angular positions with reference to the wind shield.

Each of the clamping heads is also made of substantially U-shape so as to form front and rear jaws 19 and 20 and a web 21 connecting the outer edges of these jaws. The jaws and web of each of these clamping heads are preferably constructed from a single piece of sheet metal which is provided with a longitudinal rib 22 extending along the central part of the outer sides of these jaws and web, as shown in Figs. 1, 2 and 6 for the purpose of permitting this head to be made strong, stiff and durable and yet of light metal. Each of these heads is so arranged that its jaws are arranged horizontally side by side and its rear jaw 20 is secured to one of the arms of the yoke, so as to form practically a part thereof. In the preferred construction, this connection is produced by means of a metal stud 23 secured in the outer end of one of the arms 15 by brazing or otherwise and having its outer end terminating in an externally screw threaded shank 24, which engages with an internally screw threaded boss 25 formed on the outer side of the rear jaw 20 about midway of the length of the same and in line with the central part of its reinforcing rib 22.

Means are provided for tightening and interlocking each of the clamping heads with a part of the wind shield wing adjacent to one of its vertical edges which means are preferably constructed as follows:

Adjacent to the upper and lower parts of the wind shield wing along one of its vertical edges the same is provided with upper and lower notches or grooves, each of which is preferably formed by the grinding action of a cutting wheel so that the recess or groove has a curved bottom 26 and horizontal upper and lower shoulders 27, 28.

Each of these locking recesses or grooves co-operates with a clip which is mounted on one of the clamping heads of the bracket, for the purpose of locking a wind shield wing to the bracket for supporting the same. In the preferred form of each of these clips, the same, as shown in Figs. 2, 3 and 5, comprises a flexible locking plate 29 adapted to be arranged on the inner side of the front jaw 19 and to engage with one of the locking grooves in the wind shield wing between the upper and lower shoulders 27, 28 thereof, an outer supporting plate 30 adapted to engage with the outer side and the front jaw 19 adjacent to one of its longitudinal edges, two L-shaped arms 31 passing around the respective longitudinal edge of the front clamping jaw 19 and connecting corresponding ends of the inner locking plate 29 and the outer supporting plate 30, and a slotted lug 32 arranged on the central part of the outer supporting plate 30 and bearing against the outer end of a boss 33 formed centrally on the front jaw of the respective head and having a slot 34 arranged in line with an internally screw threaded opening 35 formed in the boss. This clip is preferably constructed in one piece from sheet metal which has the requisite resilience. 36 represents a clamping screw which is arranged in the threaded opening 35 of the front jaw 19 and the slot 34 while its inner end bears against the locking plate 29 and its outer end is provided with a thumb piece 37.

Preparatory to applying the wind shield wing to the bracket, the two clamping screws 36 of the upper and lower heads are loosened or backed up sufficiently to permit the clamping plates 29 to recede or move toward the inner side of the front jaws the requisite extent to permit that vertical edge of the wind shield wing having the notches or locking grooves to be inserted between the jaws of each of the clamping or supporting heads. The relative position of these heads, the tightening device mounted thereon, and the notches or grooves of the wind shield wing are such that when the wind shield wing is inserted into the jaws of the clamping heads the notches of the wing will be arranged horizontally opposite the locking plates 29 of the tightening and locking devices. After the wing has been thus introduced into the jaws of the clamping head each of the screws 36 is tightened or turned so that its inner end moves forwardly into engagement with the locking plate 29 of the respective clip so that this locking plate is moved into the adjacent locking groove or notch of the wind shield wing and the upper and lower edges of this locking plate engage with the upper and lower shoulders 27 and 28 of the respective locking groove. Each of the screws 36 is preferably tightened sufficiently to cause the respective locking plate 29 to be curved inwardly and engage with the curved bottom 26 of the adjacent locking groove and brace the opposite or rear side of the wind shield wing against the inner side of the rear jaw 20, as shown in Figs. 2 and 3.

By this means the wing is reliably clamped on the bracket so as to hold it against vibration and the same is also interlocked therewith so that it can not slide either vertically or horizontally out of position and become detached from the bracket in the event that the clamping device should loosen up slightly.

In the event that the wind shield wing becomes broken and requires replacement, this can be easily done by unscrewing each of the screws 36 sufficiently to permit the resilience of the clip to withdraw the locking plate 29 from the respective locking groove in the wing, after which the broken wing can be readily withdrawn from the jaws and a new one substituted therefor.

It will be noted that in these means for mounting a wing on the wind shield support, the wing is not perforated but is held in place by side pressure thereby preventing the wing from becoming broken as frequently occurs in the use of brackets which are adapted to the wings by passing some of the elements through openings in the wings.

Aside from permitting ready detachment of a broken wing and replacement of the same by a new wing, this construction is comparatively simple and also very neat in appearance so that the same does not detract from the looks of the automobile on which the same is used.

I claim as my invention:

1. A wing provided on its front side with a recess, a U-shaped supporting head having a rear jaw engaging the rear side of said wing and a front jaw arranged opposite the recess on the front side of the wing, a U-shaped clip embracing said front jaw, and having a flexible part opposite said recess; and a clamping screw working in said front jaw and adapted to shift the flexible part of said clip into engagement with said recess.

2. A wing provided on its front side with a recess, a U-shaped supporting head having a rear jaw engaging the rear side of said wing and a front jaw arranged opposite the recess on the front side of the wing, a U-shaped clip embracing said front jaw and having an inner flexible part opposite said recess; and a clamping screw working in said front jaw and passing through the outer part of said clip and adapted to shift the inner flexible part of the same into locking engagement with said recess.

3. A wing provided with a recess forming upper and lower horizontal shoulders on the wing, a U-shaped supporting head having front and rear jaws which receive the wing between them and the rear one of which engages with that side of the wing opposite to the recess therein, a U-shaped clip which embraces the front jaw of said head facing the side of the wing having the recess and provided with a supporting bar engaging the outer side of said front jaw, an inner flexible locking plate engaging with said recess between the shoulders thereof and arms connecting corresponding ends of said plates, and a clamping screw working in said front jaw and engaging with said locking plate.

4. A wing provided with a recess forming upper and lower horizontal shoulders on the wing, a U-shaped supporting head having front and rear jaws which receive the wing between them and the rear one of which engages with that side of the wing opposite to the recess therein, a U-shaped clip which embraces the front jaw of said head facing the side of the wing having the recess and provided with a supporting bar engaging the outer side of said front jaw, an inner flexible locking plate engaging with said recess between the shoulders thereof, arms connecting corresponding ends of said plates and a retaining lug on said supporting plate, and a clamping screw working in said front jaw and passing through said lug and engaging said locking plate.

WILLIAM LA HODNY.